United States Patent [19]

Stephens

[11] Patent Number: 4,476,826
[45] Date of Patent: Oct. 16, 1984

[54] VANE TYPE ROTARY INTERNAL COMBUSTION ENGINE WITH TRANSFER VALVE IN ROTOR

[75] Inventor: William R. Stephens, Rockton, Ill.

[73] Assignee: William R. and Zella B. Stephens Trust, Rockford, Ill.

[21] Appl. No.: 428,380

[22] Filed: Sep. 29, 1982

[51] Int. Cl.³ .............................................. F02B 53/08
[52] U.S. Cl. ...................... 123/235; 123/236
[58] Field of Search ................ 123/229, 235, 236; 418/13

[56] References Cited

U.S. PATENT DOCUMENTS

| | | | |
|---|---|---|---|
| 1,192,665 | 7/1916 | Mears | 123/235 |
| 1,661,593 | 3/1928 | Bodker | 123/235 |
| 3,299,866 | 1/1967 | Birk | 123/235 |
| 3,820,513 | 6/1974 | Buettner | 123/229 |

FOREIGN PATENT DOCUMENTS

| | | | |
|---|---|---|---|
| 2307465 | 8/1973 | Fed. Rep. of Germany | 123/236 |
| 639070 | 3/1928 | France | 123/229 |
| 1115332 | 4/1956 | France | 123/236 |
| 1302568 | 7/1962 | France | 123/236 |
| 365879 | 12/1938 | Italy | 123/235 |
| 506554 | 5/1939 | United Kingdom | 123/236 |

*Primary Examiner*—Michael Koczo
*Attorney, Agent, or Firm*—Vernon J. Pillote

[57] ABSTRACT

A rotary internal combustion engine having a stationary casing, and a rotor mounted for rotation about an axis eccentric to the casing forming a crescent shaped compression chamber and a separate crescent shaped expansion chamber. Intake and exhaust ports in the casing respectively communicate with the compression and expansion chambers and first and second vanes angularly spaced apart on the rotor slidably engage the walls of the respective compression and expansion chambers. A rotary transfer valve is provided on the rotor intermediate the first and second vanes to alternately communicate with the compression and expansion chambers. The charge of combustible mixture is ignited while in the transfer valve.

11 Claims, 11 Drawing Figures

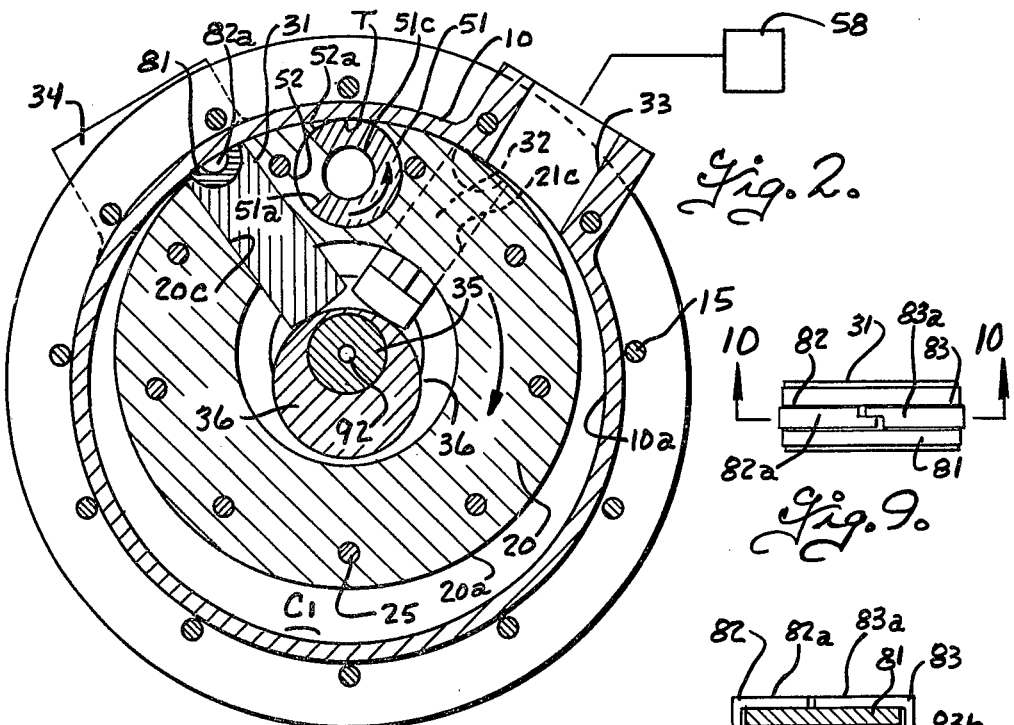
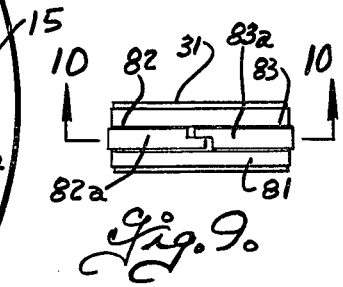
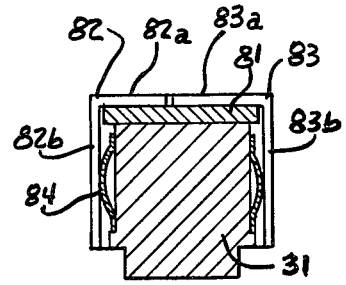
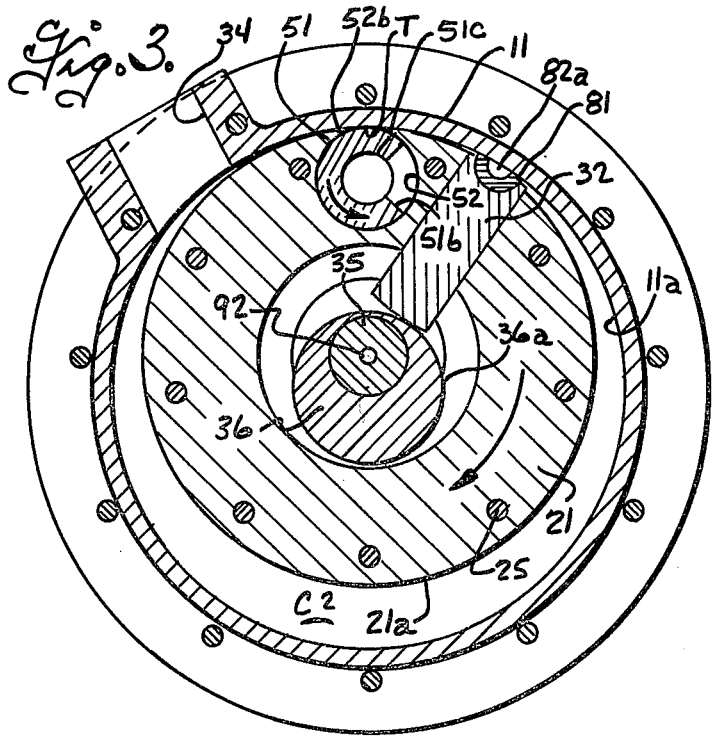
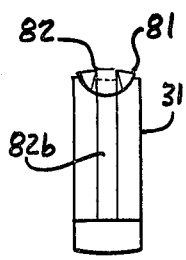

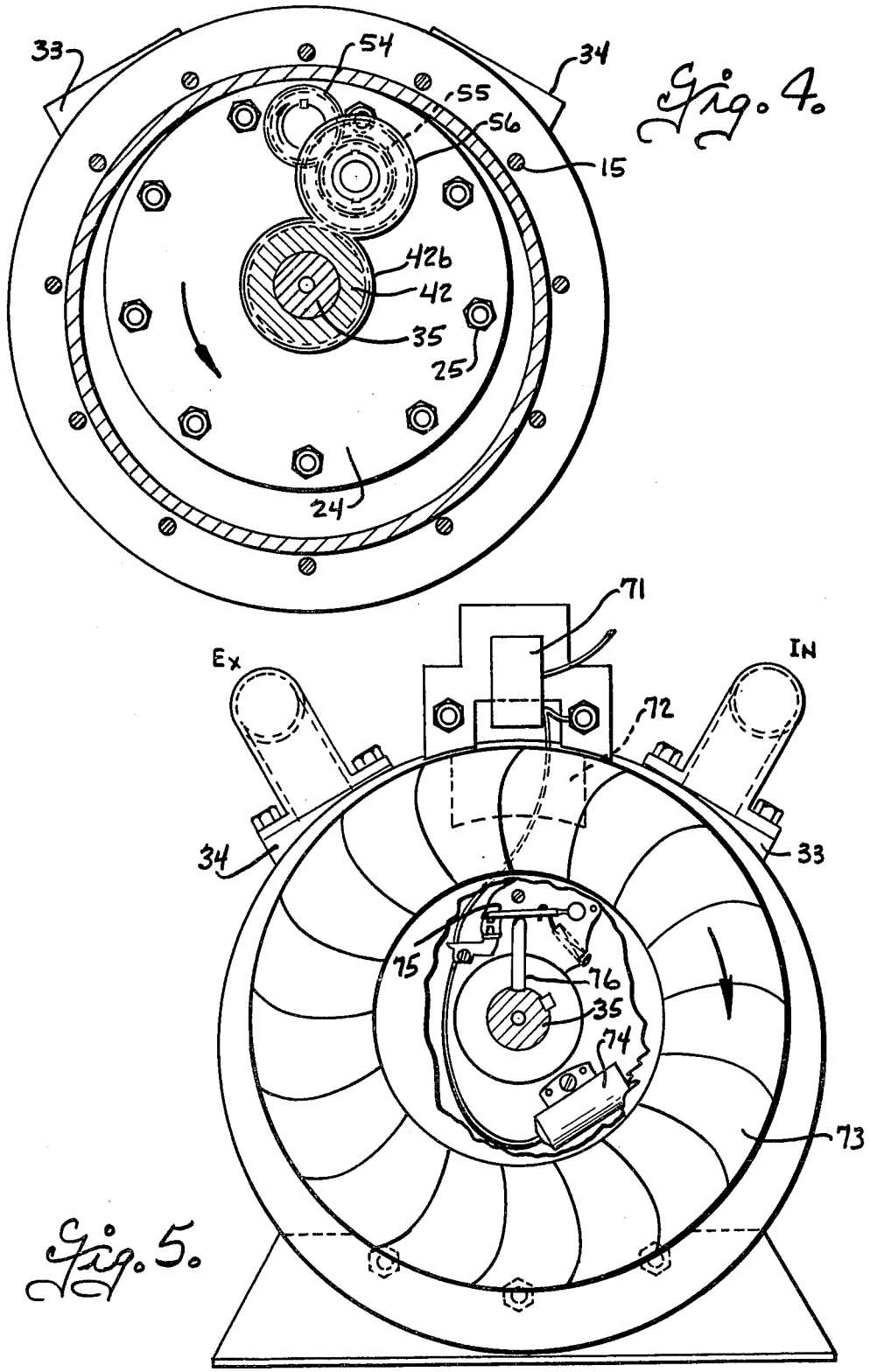

VANE TYPE ROTARY INTERNAL COMBUSTION ENGINE WITH TRANSFER VALVE IN ROTOR

The present invention relates to rotary internal combustion engines of the type having a stationary outer casing and a rotor mounted for rotation about an axis eccentric to the outer casing to form a compression chamber and a separate expansion chamber, with an intake vane and an exhaust vane mounted on the rotor in the compression and expansion chambers respectively to form a sliding seal between the rotor and casing.

An important object of this invention is to provide a rotary internal combustion engine of the type described in which the intake and exhaust ports are formed in the casing and in which a transfer valve is provided in the rotor for receiving a charge of compressed gas from the compression chamber at the leading side of the intake vane, and for delivering the charge of gas to the expansion chamber at the trailing side of the exhaust vane.

Another object of this invention is to provide a rotary internal combustion engine in accordance with the foregoing object and in which the charge of compressed gas is ignited while in the rotary transfer valve.

Still another object of this invention is to provide a rotary internal combustion engine in accordance with the foregoing objects which has intake, compression, expansion and exhaust phases that are completed once during each revolution of the rotor.

The rotary internal combustion engine according to the present invention has a stationary casing with endwise aligned first and second inner casing wall portions, an intermediate wall between the first and second inner casing wall portions and first and second end walls at the outer ends of the first and second inner casing walls. A rotor of circular cross section is disposed internally of the casing and is mounted for rotation about an axis eccentric to the latter with first and second outer rotor wall portions disposed generally tangent to respective first and second inner casing wall portions at a casing tangent location, to provide crescent shaped first and second chambers therebetween. A first vane is mounted on the rotor to extend outwardly from the first outer rotor wall portion and slidably engage the first inner casing wall portion, and a second vane is mounted on the rotor to extend outwardly from the second outer rotor wall portion and slidably engage the second inner casing wall portion, the first and second vanes on the rotor being angularly spaced apart about the axis of the rotor with the second vane angularly advanced in the direction of rotation of the rotor relative to the first vane. An inlet port is formed in the casing and communicates with the first chamber and an exhaust port is formed in the casing and communicates with the second chamber. The rotor has a first rotor port in the first outer rotor wall portion communicating with the first chamber and a second rotor port in the second outer rotor wall portion communicating with the second chamber, and a transfer valve is mounted on the rotor for rotation with the rotor about the rotor axis and for axial rotation relative to the rotor about a valve axis parallel to the rotor axis and spaced radially outwardly from the rotor axis at a location angularly intermediate the first and second vanes on the rotor. The transfer valve has a first transfer port adapted to communicate with the first rotor port and a second transfer port adapted to communicate with the second rotor port and a transfer passage connecting the first and second transfer ports, and a means is provided for rotating the transfer valve relative to the rotor in timed relation with the rotation of the rotor to communicate the first transfer port with the first rotor port during one portion of each revolution of the rotor and to communicate the second transfer port with the second rotor port during a different portion of each revolution of the rotor. Engine ignition means is provided and arranged to ignite a charge in the transfer passage of the transfer valve.

These, together with other objects, features and advantages of the present invention will be more apparent from the following description and drawings in which:

FIG. 2 is a transverse sectional view taken on the plane 2—2 of FIG. 1;

FIG. 3 is a transverse sectional view taken on the plane 3—3 of FIG. 1;

FIG. 4 is a transverse sectional view taken on the plane 4—4 of FIG. 1;

FIG. 5 is an end elevational view of the engine with parts of the fly wheel broken away to illustrate parts of the ignition apparatus;

FIG. 9 is an end elevational view of one of the rotor vanes;

FIG. 10 is a transverse sectional view through the rotor vane taken on the plane 10—10 of FIG. 9; and FIG. 11 is an end elevational view of one of the rotor vanes.

Figure 1:
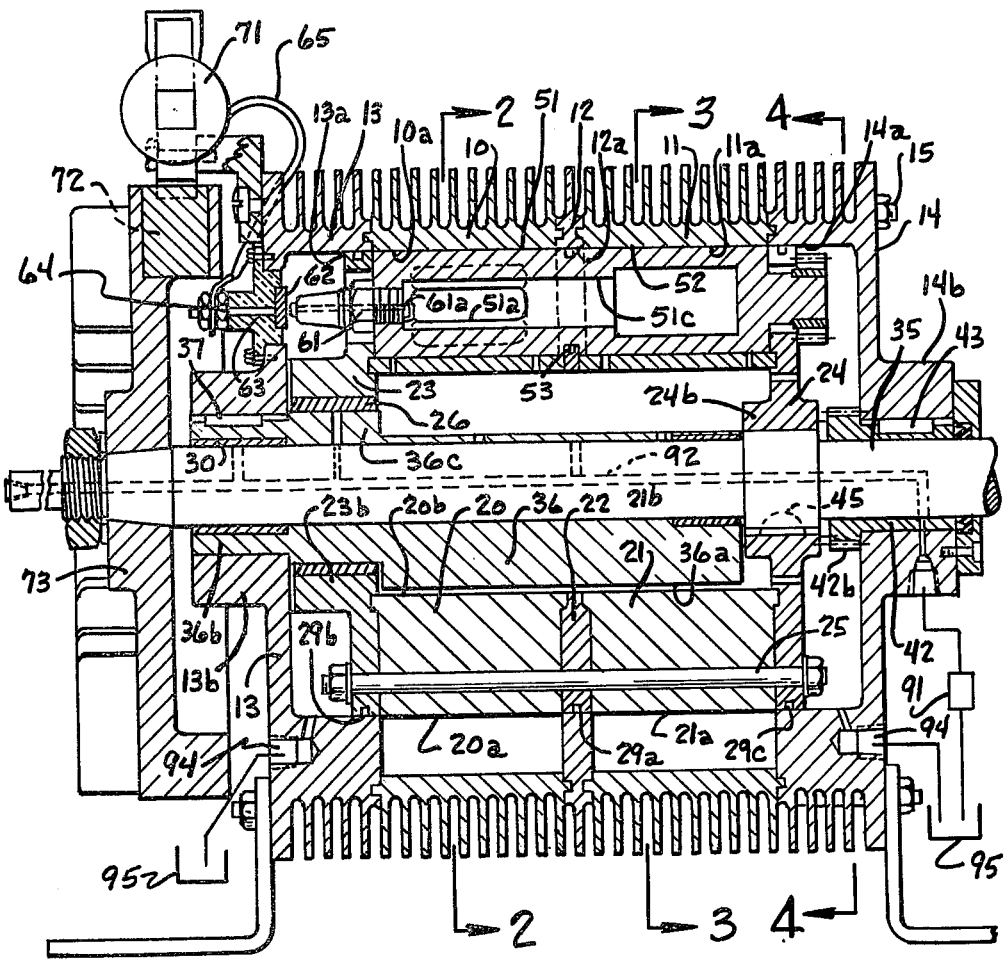
FIG. 1 is a longitudinal sectional view through a rotary internal combustion engine embodying the present invention.

The rotary internal combustion engine includes a stationary casing conveniently formed in a plurality of sections and including first and second annular casing sections 10 and 11, an intermediate wall section 12 disposed between the annular casing sections, and first and second outer end wall sections 13 and 14 disposed at the outer ends of the first and second annular casing sections 10 and 11. The several sections are joined together by a plurality of tie bolts 15 that extend through aligned openings in the annular casing wall sections 10 and 11 and in the intermediate and end wall sections 12-14. As best shown in FIG. 1, annular ribs are provided on the ends of the casing sections 10 and 11 and extend into complementary recesses in the adjacent intermediate and end wall sections to radially locate the several sections relative to each other and to aid in sealing the interface therebeteen. The first and second annular casing wall sections 10 and 11 respectively define inner casing walls 10a and 11a of preferably right cylindrical configuration.

A rotor is mounted inside the casing for rotation relative thereto about an axis eccentric to the annular casing walls 10a and 11a. The rotor is also conveniently formed in a plurality of sections and includes first and second annular rotor sections 20 and 21, an intermediate rotor section 22, and first and second end rotor sections 23 and 24. The several rotor sections are joined together by tie bolts 25 that extend through aligned openings in the first and second rotor sections 20, 21 and in the intermediate and end rotor sections 22-24. As shown in FIG. 1, an annular locating rib is provided on the ends of each of the rotor sections 20 and 21 and extends into complementary recesses in the intermediate and end rotor sections 22-24 to radially locate the rotor sections relative to each other and to aid in sealing the interface therebetween. The rotor sections 20 and 21 have outer surfaces 20a and 21a respectively of right cylindrical configuration, and the rotor sections 20a and 21a also have internal rotor wall portions 20b and 21b respectively concentric with the outer rotor walls 20a and 21a.

The rotor is mounted for rotation with a shaft 35 relative to the casing about an axis eccentric to the first and second casing walls 10a and 11a, and with the outer rotor walls 20a and 21a respectively disposed generally tangent to the casing walls 10a and 11a respectively at a casing tangent location designated T to provide crescent shaped first and second chambers $C_1$ and $C_2$ therebetween. The intermediate and end casing wall sections 12-14 have internal walls 12a-14a, respectively disposed eccentric to the casing walls 10a, and 11a, and of a diameter to rotatably receive the outer peripheries of the respective intermediate and end rotor sections 22-24. Annular seal rings 29a-29c are advantageously mounted in grooves on the peripheries of the intermediate and end rotor sections 22-24, to form running seals between the rotor and casing at locations intermediate the chambers $C_1$ and $C_2$ and at the outer ends of these chambers.

An intake port 33 is formed in the casing and extends through the inner casing wall 10a to communicate with the chamber $C_1$ at a location angularly spaced in the direction of rotation of the rotor from the casing tangent location T. An exhaust port 34 is formed in the casing and extends through the inner casing wall 11a of the second casing section 11 to communicate with the chamber $C_2$ at a location angularly spaced in a direction opposite the direction of rotation of the rotor from the casing tangent location T. A first vane 31 is slidably mounted in a generally radially extending slot 20c in the first rotor section 20, and a second vane 32 is mounted in a generally radially extending slot 21c in the second rotor section 21. As best shown in FIG. 2, the vanes 31 and 32 are angularly spaced apart about the axis of the rotor at an acute angle and second vane 32 is angularly advanced in the direction of rotation of the rotor relative to the first vane 31. The vanes 31 and 32 are arranged to form a sliding seal with the inner casing walls 10a and 11a respectively and a stationary cam 36 is advantageously provided internally of the rotor with a cylindrical cam surface 36a disposed concentric with the inner casing walls 10a and 11a, to engage the inner ends of the vanes and positively maintain the outer ends of the vanes in sliding contact with the walls 10a and 11a.

In the embodiment illustrated, the shaft 35 is arranged to extend out of both ends of the casing and in order to hold the cam 36 stationary, an extension 36b is provided on one end of the cam and non-rotatably keyed as by key 37 to a hub 13b on the end wall section 13 of the casing. One end portion of the shaft 35 is rotatably supported in a bearing 30 on the extension 36b of the cam, and the other end of the shaft is rotatably supported in a member 42 non-rotatably connected as by key 43 to a hub 14b on the end wall section 14 of the casing. One end wall section 24 of the rotor has a hub 24b non-rotatably keyed as by a key 45 to the shaft for rotation therewith. The other rotor end wall 23 of the rotor has a hub 23b rotatably supported as by a bearing 26 on a mounting portion 36c at one end of the cam 36.

The outer peripheral walls 21a and 21b of the rotor sections extend in close running fit with the inner casing walls 10a and 11a respectively at the casing tangent location T to form a running seal therewith, and, as the first or intake vane 31 moves with the rotor in the direction indicated by the arrow in FIG. 2 past the outlet edge of the intake port 33, it starts to compress the gas in the intake chamber $C_1$ at the lead side of the vane and to draw in a succeeding charge of fluid into the chamber $C_1$ at the trail side of the vane. A rotary transfer valve 51 is mounted in a cylindrical bore 52 in the rotor for rotation with the rotor about the rotor axis and for axial rotation relative to the rotor about a valve axis parallel to the rotor axis and spaced radially outwardly from the rotor axis at a location angularly intermediate the first and second vanes 31 and 32 on the rotor. The rotor has a first rotor port 52a extending between the cylindrical bore 52 and the outer wall 20a of the rotor section 20 to communicate with the first chamber $C_1$. The rotor also has a second rotor port 52b extending between the cylindrical bore 52 and opening at the outer wall 21a of the rotor section 21 to communicate with the second chamber $C_2$. The transfer valve 51 has a first transfer port 51a adjacent one end arranged to communicate with the first rotor port 52a and a second transfer port 51b adjacent its other end arranged to communicate with the second rotor port 52b, and a transfer passage 51c connecting the first and second transfer ports 51a and 51b. An annular seal ring 53 is disposed in a groove in the outer periphery of the transfer valve to form a seal between the transfer valve and rotor at a location intermediate the rotor ports 52a and 52b. The first and second transfer ports 51a and 51b are angularly spaced apart about the axis of the transfer valve and provision is made for rotating the transfer valve relative to the rotor in timed relation with the rotation of the rotor to communicate the first transfer port with the first rotor port during one portion of each revolution of the rotor and to communicate the second transfer port with the second rotor port during a different portion of each revolution of the rotor. As best shown in FIGS. 1 and 4, a stationary gear 42b is fixed to the casing and is conveniently formed integrally with the member 42, and a transfer valve gear 54 is mounted on one end of the transfer valve and connected through intermediate gears 55 and 56 to the stationary gear 42b. The gearing is arranged to rotate the transfer valve relative to the rotor in a direction opposite the direction of rotation of the rotor, as indicated by the arrow in FIGS. 2-4, to cause the transfer valve to rotate through one revolution relative to the rotor as the rotor rotates through a revolution. With this arrangement, the transfer valve rotates in a circular path with the rotor and turns relative to the rotor so that the transfer port 51a constantly faces to the left as viewed in FIG. 2 and the transfer port 51b constantly faces to the right as viewed in FIG. 3. The rotor is shown in FIGS. 2 and 3 in a position with the rotor ports 52a and 52b and the transfer valve 51 at the casing tangent location T, which rotor position is herein sometimes referred to as top dead center. The angular width of the transfer ports 51a and 51b about the transfer valve axis and the angular width of the rotor ports 52a and 52b about the transfer valve axis is made such that the second transfer valve port 51b begins to communicate with the chamber $C_2$ a few degrees, for example 15° after top dead center and the port 51b continues to communicate with the chamber $C_2$ until the transfer valve reaches a location less than 180° from top dead center. The first transfer port 51a begins to communicate with the first chamber $C_1$ slightly after the transfer valve reaches a location 180° from top dead center and after the transfer port 51b is closed, and the transfer port 51a continues to communicate with the first or inlet chamber $C_1$ as the transfer valve rotates with the rotor to a position slightly before top dead center. In the embodiment shown, the transfer ports 51a and 51b extend through an angle of about 90° with respect to the transfer valve axis and the rotor ports 52a and 52b extend through an angle of about 75° relative to the transfer valve axis. As shown in FIGS. 2 and 3, the intake and exhaust ports 33 and 34 are angularly spaced apart on the casing about 75° and are located at relatively opposite sides of the casing tangent location, and the vanes 31 and 32 are angularly spaced apart on the rotor at a similar angle.

A combustible mixture is supplied to the intake port 34 from a carburetor 58 diagrammatically illustrated in FIG. 2, and provision is made for igniting the combustible charge in the transfer passage of the transfer valve. As shown in FIG. 1, a spark plug 61 is mounted in one end of the transfer valve 51 with its electrodes 61a extending into the transfer passage. The spark plug rotates with the rotor and a plate 62 of electrically conductive material is provided on the casing and arranged to extend in close running clearance with the path of movement of the terminal end of the spark plug as the rotor moves toward and away from its top dead center position, to transfer an ignition pulse to the spark plug. The wiper is arranged to extend through a substantial arc of travel of the spark plug and is mounted on block 63 of electrically insulative material and is connected through a rod 64 and conductor 65 to an ignition apparatus operated in timed relation with the rotation of the rotor. In the embodiment illustrated, the ignition apparatus is of the fly-wheel magneto type and includes an ignition coil 71, a permanent magnet 72 on the engine flywheel 73, a condenser 74 and breaker points 75 operated from a cam 76 on the engine shaft 35. It is deemed apparent that any other suitable ignition system for applying an energizing pulse to the wiper 62 and hence the plug 61 is timed relation with the rotation of the rotor, can be utilized.

Figures 6, 7, 8:
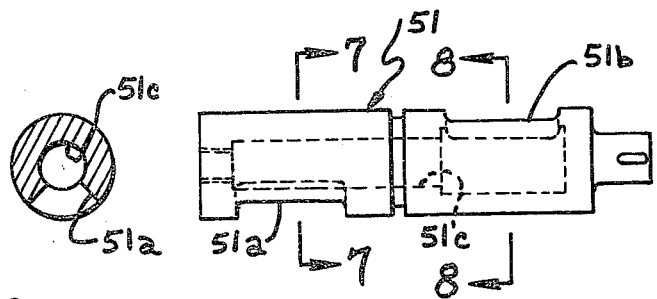
FIG. 6 is a side elevational view of the rotary transfer valve.
FIG. 7 is a transverse sectional view through the transfer valve taken on the plane 7—7 of FIG. 6.
FIG. 8 is a transverse sectional view through the transfer valve taken on the plane 8—8 of FIG. 6.

Seals are provided on the vanes 31 and 32 to form a sliding seal with the peripheral and side walls of the respective chambers. As best shown in FIGS. 2, 3 and 9-11, a semi-cylindrical wiper 81 is mounted in a complementary recess in the outer edge of each vane. A pair of generally L-shaped members 82 and 83 are provided with one leg 82a, 83a disposed in a recess in the outer edge of the semi-cylindrical wiper 81, and legs 82b, 83b disposed in grooves along the side edges of the vanes. As best shown in FIGS. 2 and 3, the legs 82a, 83a have a generally cylindrical undersurface that is received in a complementary semi-cylindrical recess in the wiper to allow turning of the semi-cylindrical wiper. The legs 82b and 83b of the members are yieldably urged outwardly into engagement with the side walls of the chambers by leaf springs 84 as shown in FIG. 6. The ends of the legs 82a and 83a are preferably notched to overlap as best shown in FIG. 9.

A lubrication system is provided for lubricating the bearings and other relatively moving parts and, as diagrammatically shown in FIG. 1, lubricant is fed by a pump 91 to a passage 92 in the shaft 35 and is distributed through lateral passages in the shaft to its bearings and inner side of the rotor. The lubricant is returned through passages 94 to sumps 95 for recirculation by the pump.

From the foregoing it is believed that the construction and operation of the rotary internal combustion engine will be readily understood. The rotor is shown in FIGS. 1-3 in its top dead center position with the transfer valve adjacent the casing tangent location. The transfer port 51a closes about 15° before the rotor reaches its top dead center position and the transfer port 51b opens about 15° after top dead center. A charge of combustible mixture is supplied to the transfer passage before the rotor reaches top dead center and the charge is ignited in the transfer passage after the port 51a is closed and before the port 51b opens. When the transfer port 51b opens, the charge that is ignited in the transfer valve passes into the expansion chamber $C_2$ at the trail side of the vane 32 to drive the rotor in the direction indicated by the arrow. The transfer port 51b closes when the rotor reaches a position about 180° from top dead center and shortly thereafter the transfer port 51a opens to communicate the transfer passage with the inlet chamber $C_1$. As the rotor rotates, the charge in the chamber $C_1$ is compressed at the lead side of the vane 31 and it is forced into the transfer passage in the transfer valve. Port 51a closes slightly before top dead center and the ignition apparatus is again operated to ignite the charge in the transfer valve to complete another cycle.

As the rotor rotates through each revolution, the gas charge in the chamber $C_1$ is compressed at the lead side of the vane 31 and a succeeding charge is drawn into the chamber $C_1$ at the trail side of the vane 31. Also during each revolution, the charge from the transfer valve is discharged into the chamber $C_2$ and expands at the trail side of the vane 32 while the lead side of the vane 32 scavenges the previously expanded gases from the chamber $C_2$. Thus, a full cycle of intake, compression, expansion and exhaust occurs during each revolution of the rotor.

The embodiments of the invention in which an exclusive property or privilege is claimed are defined as follows:

1. A rotary internal combustion engine comprising, a stationary casing having endwise aligned first and second inner casing wall portions of circular cross-section and like diameter with their longitudinal centers aligned along a casing longitudinal axis, an intermediate wall means between the first and second inner casing wall portions and first and second end wall means at the outer ends of the first and second inner casing wall portions, a rotor having first and second outer rotor wall portions of circular cross-section and like diameter respectively disposed internally of the first and second inner casing wall portions and mounted for rotation in a motor direction about a rotor longitudinal axis eccentric to the casing longitudinal axis with the first and second outer rotor wall portions disposed generally tangent to the respective first and second inner casing wall portions at a casing tangent location to provide crescent shaped first and second chambers therebetween, a single first vane means mounted on the rotor for rotation therewith and for sliding movement relative thereto in a direction generally radially of the rotor to extend outwardly from the first outer rotor wall portion and slidably engage the first inner casing wall portion, a single second vane means mounted on the rotor for rotation therewith and for sliding movement relative thereto in a direction generally radially of the rotor to extend outwardly from the second outer rotor wall portion and slidably engage the second inner casing wall portion, the first and second vane means on the rotor being angularly spaced apart about the axis of the rotor at an acute angle with the second vane means being angularly advanced in the direction of rotation of the rotor relative to the first vane means, inlet port means in the casing communicating with the first chamber, exhaust port means in the casing communicating with the second chamber, said intake and exhaust ports being respectively formed in said first and second inner wall casing portions at relatively opposite sides of the casing tangent location and angularly spaced apart about the longitudinal casing axis at an acute angle, the rotor having first rotor port means in the first outer rotor wall portion at a location on the rotor angularly spaced in said motor direction from said first vane means and communicating with the first chamber and second rotor port means in the second outer rotor wall portion at a location on the rotor angularly spaced in a direction opposite said motor direction from the second vane means and communicating with the second chamber, transfer valve means mounted on the rotor for rotation with the rotor about the rotor longitudinal axis and for axial rotation relative to the rotor about a valve axis parallel to the rotor longitudinal axis and spaced radially outwardly from the rotor longitudinal axis and located angularly intermediate the first and second vane means on the rotor, the transfer valve means having a first transfer port adapted to communicate with the first rotor port and a second transfer port adapted to communicate with the second rotor port and transfer passage means connecting the first and second transfer ports, means for rotating the transfer valve means relative to the rotor in timed relation with the rotation of the rotor to communicate the first transfer port with the first rotor port during one portion of each revolution of the rotor and to communicate the second transfer port with the second rotor port during a different portion of each revolution of the rotor, and engine ignition means operated in timed relation with the rotation of the rotor for igniting a charge in the transfer passage means of the transfer valve means.

2. A rotary internal combustion engine according to claim 1 wherein said ignition means includes a spark plug mounted on the transfer valve means adjacent the first transfer port for igniting a charge in the transfer passage of the transfer valve means.

3. A rotary internal combustion engine according to claim 1 wherein said first and second rotor port means are located in the respective first and second outer rotor wall portions angularly intermediate said first and second vane means, said first and second transfer ports being spaced apart along the axis of the transfer valve means and angularly spaced apart about the axis of the transfer valve means to alternately communicate the transfer passage means with the first and second rotor ports.

4. A rotary internal combustion engine according to claim 1 wherein said first and second rotor port means are substantially aligned in a direction paralleling the rotor longitudinal axis at a location angularly intermediate said first and second vane means, said first and second transfer ports being spaced apart along the axis of the transfer valve and angularly spaced apart about the axis of the transfer valve to alternately communicate the transfer passage with the first and second rotor ports.

5. A rotary internal combustion engine according to claim 1 including stationary cam means on the casing internally of the rotor engaging the first and second vane means to maintain the outer ends of the first and second vane means in sliding contact with the respective first and second inner casing wall portions as the rotor rotates.

6. A rotary internal combustion engine according to claim 1 wherein the means for rotating the transfer valve means relative to the rotor includes a stationary drive member on said casing concentric with the axis of the rotor, and a rotary drive member fixed on one end of the transfer valve means, and means drivingly connecting the stationary drive member and the rotary drive member on the transfer valve means to rotate the transfer valve means about its axis through one revolution in a direction opposite the direction of the rotation of the rotor as the rotor rotates about its axis through one revolution.

7. A rotary internal combustion engine according to claim 1 wherein said first and second end wall means on the casing respectively have first and second cylindrical seal wall portions eccentric to said first and second inner casing wall portions and concentric with said rotor longitudinal axis and dimensioned to telescopically receive and form a running seal with the outer periphery of the rotor at opposite ends of the rotor.

8. A rotary internal combustion engine according to claim 7 wherein the first and second inner casing wall portions are formed on casing sections separable from the intermediate and first and second end wall means.

9. A rotary internal combustion engine according to claim 7 wherein the first and second outer rotor wall portions are formed on first and second rotor sections, and the rotor has first and second rotor end walls at opposite ends separate from the first and second rotor sections and respectively extending into said first and second cylindrical seal wall portions on the casing.

10. A rotary internal combustion engine according to claim 1 wherein said first and second inner casing wall portions are formed on casing sections separable from the intermediate and first and second end wall means, said first and second outer rotor wall portions being formed on first and second rotor sections, the rotor having first and second rotor end walls at opposite ends separate from the first and second rotor sections with an outer diameter the same as the first and second outer rotor wall portions, said first and second end wall means on the casing respectively having first and second cylindrical seal wall portions eccentric to said first and second inner casing wall portions and concentric with said rotor longitudinal axis and dimensioned to telescopically receive the outer periphery of the first and second rotor end walls and form a running seal therewith.

11. A rotary internal combustion engine according to claim 10 wherein said rotor has an intermediate rotor section between said first and second rotor sections and having the same outer diameter, said intermediate wall means on the casing having an inner wall surface eccentric to the first and second casing wall portions and concentric with the rotor longitudinal axis and having a diameter to receive and form a running seal with the intermediate rotor section.

* * * * *